United States Patent [19]

Rasmusson

[11] Patent Number: 5,636,272
[45] Date of Patent: Jun. 3, 1997

[54] APPARATUS AMD METHOD FOR INCREASING THE INTELLIGIBILITY OF A LOUDSPEAKER OUTPUT AND FOR ECHO CANCELLATION IN TELEPHONES

[75] Inventor: Jim J. A. Rasmusson, Brosarp, Sweden

[73] Assignee: Ericsson Inc., Research Triangle Park, N.C.

[21] Appl. No.: 452,904

[22] Filed: May 30, 1995

[51] Int. Cl.$^6$ ........................................... H04M 9/08
[52] U.S. Cl. ..................... 379/406; 379/388; 379/390; 379/410; 379/411
[58] Field of Search ........................ 379/406, 410, 379/411, 389, 390, 388, 391; 381/63, 86; 455/89, 127

[56] References Cited

U.S. PATENT DOCUMENTS

| | | | |
|---|---|---|---|
| 3,300,583 | 1/1967 | Mikelevicius . | |
| 4,670,903 | 6/1987 | Araseki et al. | 379/410 |
| 4,922,530 | 5/1990 | Kenney et al. | 379/411 |
| 4,953,219 | 8/1990 | Kasai et al. | 381/86 |
| 5,027,369 | 6/1991 | Kuenast | 375/14 |
| 5,027,393 | 6/1991 | Yamamura et al. | 379/410 |
| 5,083,311 | 1/1992 | Kasai et al. | 381/63 |
| 5,173,924 | 12/1992 | Hiraiwa et al. | 375/12 |
| 5,201,005 | 4/1993 | Matsushita et al. | 381/63 |
| 5,278,780 | 1/1994 | Eguchi | 364/724.19 |
| 5,313,498 | 5/1994 | Sano | 379/410 |
| 5,319,585 | 6/1994 | Amrany | 364/724.19 |
| 5,323,458 | 6/1994 | Park et al. | 379/391 |
| 5,349,609 | 9/1994 | Tsujimoto | 375/100 |
| 5,414,766 | 5/1995 | Cannalire et al. | 379/410 |
| 5,414,767 | 5/1995 | Kerguiduff | 379/390 |
| 5,471,528 | 11/1995 | Reesor | 379/388 |

FOREIGN PATENT DOCUMENTS

| | | | |
|---|---|---|---|
| 0311754 | 4/1989 | European Pat. Off. | H04M 3/56 |
| 0614304 | 9/1994 | European Pat. Off. | H04M 9/08 |
| 983636 | 2/1965 | United Kingdom . | |

OTHER PUBLICATIONS

M. Walker, "Handsfree Speaking, A Step Towards Natural Communication," 1225 Electrical Communication (1993) 2nd Quarter, Paris, FR, pp. 181–187.

*Primary Examiner*—Krista M. Zele
*Assistant Examiner*—Jacquet M. Saint-Surin
*Attorney, Agent, or Firm*—David G. Matthews; David C. Hall

[57] ABSTRACT

A telephone having a method and apparatus for increasing the intelligibility of the loudspeaker output and for echo cancellation. The telephone includes an intelligibility booster for processing a speech input signal to generate an intelligibility-enhanced signal. The intelligibility booster includes a reverberation signal path for generating a reverberation signal, a direct signal path for generating an attenuated direct signal corresponding to the input signal, and an adder for combining the reverberation signal and direct signal to generate the intelligibility-enhanced signal. The reverberation signal path includes an intelligibility-information emphasizer followed by a reverberation unit. In the preferred embodiment, the intelligibility information emphasizer is a high pass filter and/or compressor that generates an intelligibility-dense signal to generate the reverberation signal. The reverberation unit processes the intelligibility dense signal which includes a stream of reverberation sequences of weighted delay signals. The weighted delay signals of each reverberation sequence are weighted according to an exponential decay pattern and so that the time delays between weighted delay signals tend to increase over the reverberation period. In response to the intelligibility-enhanced signal, a loudspeaker outputs a speech sound wave having an artificial reverberation component corresponding to the reverberation signal. An echo canceller uses the intelligibility-enhanced signal in cancelling an echo component in a microphone signal generated by the microphone of the telephone.

28 Claims, 9 Drawing Sheets

APPARATUS AMD METHOD FOR INCREASING THE INTELLIGIBILITY OF A LOUDSPEAKER OUTPUT AND FOR ECHO CANCELLATION IN TELEPHONES

FIELD OF THE INVENTION

This invention relates to the field of telephony, and more particularly to increasing the intelligibility of speech outputted from a loudspeaker of a telephone and to echo cancellation in a telephone.

BACKGROUND OF THE INVENTION

Radio telephones are used in vehicles and in other areas where there is often a high level of background noise. A high level of background noise can make it difficult for the user of the telephone to understand the speech being outputted by the loudspeaker or earphone of the telephone. The ability of the user to understand the speech being outputted by the loudspeaker is obviously essential and is referred to as the readability or intelligibility of the outputted speech.

In the past, the most common solution to overcoming background noise was to simply increase the volume at which the loudspeaker outputs speech. One problem with this solution is that the maximum output sound level that a loudspeaker can generate is limited. Due to the need to produce cost-competitive telephones, telephones often use lower-cost loudspeakers with limited power handling capabilities. The maximum sound level that such loudspeakers can generate is often insufficient due to high background noise.

Attempts to overcome the background noise by simply increasing the volume of the loudspeaker output can also result in overloading the loudspeaker. Overloading the loudspeaker introduces distortion to the loudspeaker output and further decreases the intelligibility of the outputted speech. Increasing the volume of the outputted speech also increases the problem of the microphone of the telephone picking up echoes from the loudspeaker output. The echoes of the speech output can result in the remote user of a linked, remote telephone hearing an echo of his or her own voice. This echo is annoying and can be removed with an adaptive echo cancellation filter or echo canceller. The complexity of the echo canceller should be minimized to limit the cost of the phone.

A telephone is needed that increases the intelligibility of speech outputted by the loudspeaker and that provides cost-effective echo cancellation.

SUMMARY

The present invention is a method and apparatus that increases the intelligibility of speech outputted by a telephone loudspeaker and that provides echo cancellation in a telephone. The present invention can be employed in cellular radio telephones and fixed telephones to improve the speech outputted by a loudspeaker or earphone located in the telephone handset or in a hands-free apparatus like a speaker-telephone. A telephone of the present invention includes an intelligibility booster for digitally processing a speech input signal to generate an intelligibility-enhanced signal having a direct signal component and a reverberation signal component. A telephone loudspeaker is responsive to the intelligibility-enhanced signal and outputs intelligibility-enhanced speech corresponding to the intelligibility-enhanced signal. The telephone further includes an echo canceller for digitally processing a microphone signal to remove echo produced by the speech output of the telephone loudspeaker.

The intelligibility booster includes a reverberation signal path for generating a reverberation signal, a direct signal path for outputting a direct signal, and an adder for combining the reverberation signal and the direct signal to produce the intelligibility-enhanced signal. The reverberation signal path is comprised of an intelligibility-information emphasizer followed by a reverberation unit. The intelligibility-information emphasizer digitally processes a speech input signal using a high pass filter and/or compressor stage. The intelligibility-information emphasizer emphasizes intelligibility information of speech and outputs an intelligibility-dense signal comprised of a plurality of samples.

The reverberation unit processes the intelligibility-dense signal to generate successive sequences of weighted-delay signals. The reverberation unit generates a sequence of weighted-delay signals by multiplying a sequence of delay signals with a sequence of filter coefficients. The filter coefficient sequence is selected so that the amplitudes of a sequence of weighted-delay signals are weighted according to an exponential decay pattern extending over a reverberation period. The sequence of weighted-delay signals also have an exponentially-increasing delay pattern in that the delay periods between successive weighted-delay signals increase in a generally exponential pattern over the reverberation period. Each sequence of weighted delay signals is summed to produce the reverberation signal.

The direct signal path processes the input speech signal in parallel with the reverberation signal path and includes an attenuator for outputting an attenuated input signal. The adder combines samples of the attenuated input signal with samples of the reverberation signal to produce the intelligibility-enhanced signal which includes a reverberation signal component comprised of sequences of weighted-delay signals and a direct signal component formed by the attenuated input signal. The input speech signal is attenuated in the direct signal path so that the combined power level of the attenuated input signal and the reverberation signal (i.e. intelligibility-enhanced signal) outputted by the intelligibility booster approximately equals the power level of the speech input signal inputted to the intelligibility booster. Accordingly, processing by the intelligibility booster does not increase the loudspeaker power level and helps prevent the loudspeaker from overloading.

The loudspeaker of the telephone outputs a sound pressure wave; i.e. speech, in response to the intelligibility-enhanced signal. The loudspeaker output accordingly includes a direct component corresponding to the direct input signal and an artificial reverberation component corresponding to the reverberation signal generated by the reverberation signal path. The artificial reverberation component is added on top of the direct component and adds intelligibility to the speech outputted by the loudspeaker.

The reverberation component adds intelligibility to the speech output because the human hearing mechanism "equalizes" or (averages) incoming sound over a reverberation period to determine what is being spoken. In an optimal acoustic environment for speech, a sequence of delay signals is created over a reverberation period when a speech sound is outputted in the acoustic environment. The sequence of delay signals associated with the speech sound has an exponential decay pattern and a pattern of exponentially decreasing delay periods between successive echoes over the reverberation period. The reverberation component results in the human hearing mechanism having more useful sound energy, compared to the sound energy available from the direct (or original) signal alone.

The intelligibility of the speech outputted by a telephone of the present invention is optimized by generating a speech output having an artificial reverberation component that parallels the echo or reverberation generated by speech outputted in an optimal acoustic environment. More specifically, the speech output includes an artificial reverberation component made up of successive sequences of weighted-delay signals where the weighted-delay signals of each sequence of weighted-delay signals have an exponential decay pattern and a pattern of exponentially increasing delay periods between successive echoes over the reverberation period.

By outputting speech having an artificial reverberation component that has characteristics paralleling natural reverberations created in an optimal acoustic space and that is also dense in intelligibility information, the outputted speech sounds more natural and includes more intelligibility information. The increased intelligibility enables a telephone user to better understand speech outputted at a given power level, in general, and especially when the background noise level is high. The outputted speech also has sufficient identification information to make the speech sound natural because, unlike the artificial reverberation component, the direct component is not processed to emphasize intelligibility information.

The echo canceller processes microphone input signals of a telephone microphone to remove echo signals produced by the loudspeaker output. The echo signals produced by the loudspeaker are a function of the unknown system formed by the acoustic environment surrounding the loudspeaker such as the echo path in a vehicle interior or the interior of a telephone. The echo canceller cancels the echo component of the microphone signal that is correlated with the echoes of the loudspeaker output produced in the acoustic environment. The echo component is cancelled by tapping the speech input signal after the speech input signal has been processed by the intelligibility booster (i.e., tapping the intelligibility-enhanced signal). The echo canceller uses the intelligibility-enhanced signal in cancelling the echo component of the microphone signal. By tapping the speech signal after processing by the intelligibility booster, the complexity of the echo canceller can be minimized because the unknown system of the echo canceller can be limited to the acoustic environment surrounding the loudspeaker.

In an alternate embodiment, the intelligibility of the input speech signal is also increased by providing a left output channel leading to a left loudspeaker and a right output channel leading to a right loudspeaker. The left output channel includes a left reverberation unit and the right output channel includes a right reverberation unit. The left and right reverberation units each generate distinct reverberation components to provide a pseudo-stereo field with extra spatial information.

DETAILED DESCRIPTION OF THE PREFERRED EMBODIMENT

The present invention will now be described more fully hereinafter with reference to the accompanying drawings, in which preferred embodiments of the present invention are shown. This invention may, however, be embodied in many different forms and should not be construed as limited to the embodiment set forth herein; rather, these embodiments are provided so that this disclosure will be thorough and complete, and will fully convey the scope of the invention to those skilled in the art. Like numbers refer to like elements throughout.

Figure 1:
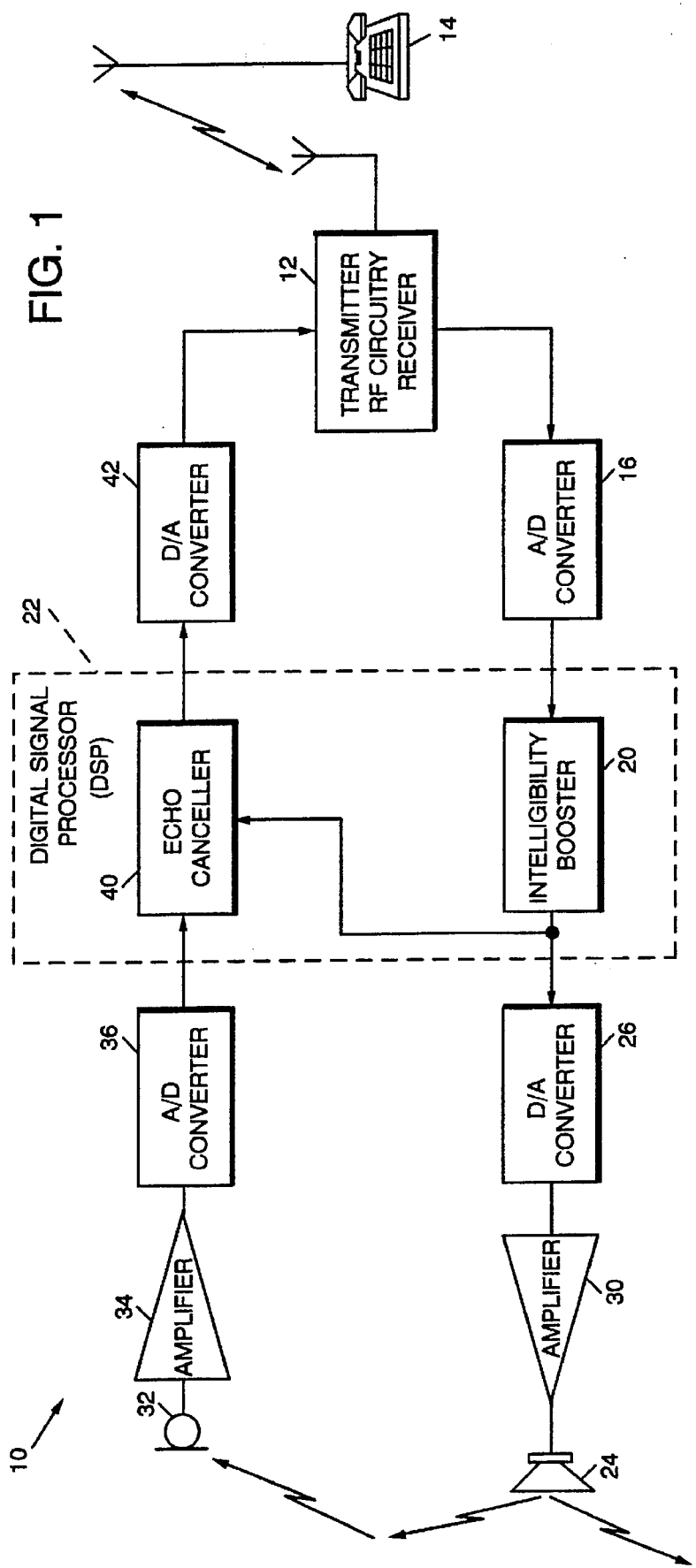
FIG. 1 is a schematic diagram of a telephone, according to preferred embodiment of the present invention.

Referring to FIG. 1, a preferred embodiment telephone 10 according to the present invention is shown. In the preferred embodiment, telephone 10 is a cellular radio telephone having a loudspeaker or earphone located in a handset. Telephone 10 includes a conventional transmitter, RF circuitry, and receiver 12 for transmitting and receiving speech signals to and from a remote telephone 14.

Receiver 12 receives a speech signal from the remote telephone 14 and after normal demodulation, etc. outputs an analog speech input signal to an analog-to-digital (A/D) converter 16. A/D converter 16 converts the analog input signal to a digital input signal for digital processing by an intelligibility booster 20. A/D converter 16 converts the received analog input signal to a digital input signal by sampling and quantizing the analog input signal to form a sequence of samples representing the analog input signal. A typical sampling rate of analog signals in telecommunications is 8,000 samples per second and the samples typically have a resolution of 13 to 16 bits.

Intelligibility booster 20 is implemented by a digital signal processor(DSP) 22 and generates an intelligibility-enhanced signal that is outputted by a loudspeaker 24 after having passed through a conventional digital-to-analog (D/A) converter 26 and amplifier 30. Loudspeaker 24 outputs sound pressure waves corresponding to the intelligibility-enhanced signal. As shown in FIG. 1, the sound pressure waves are outputted into an acoustic space and echoes of the sound pressure waves travel along an acoustic path leading to a microphone 32. Microphone 32 produces a microphone signal that includes echoes of the loudspeaker output.

The microphone signal is inputted to a conventional amplifier 34 and A/D converter 36 for producing a digital microphone signal for processing by echo canceller 40. Echo canceller 40 is implemented by digital signal processor 22 and removes loudspeaker echo from the microphone signal. As shown in FIG. 1, the intelligibility-enhanced signal generated by the intelligibility booster 20 is input into the echo canceller 40. The echo canceller 40 uses the intelligibility-enhanced signal in removing the loudspeaker echo from the microphone input signal to produce an echo-canceled signal for output to digital-to-analog (D/A) converter 42. D/A converter 42 converts the echo-cancelled signal to an analog output signal for transmission by the transmitter 12 to the remote telephone 14.

Figure 2:
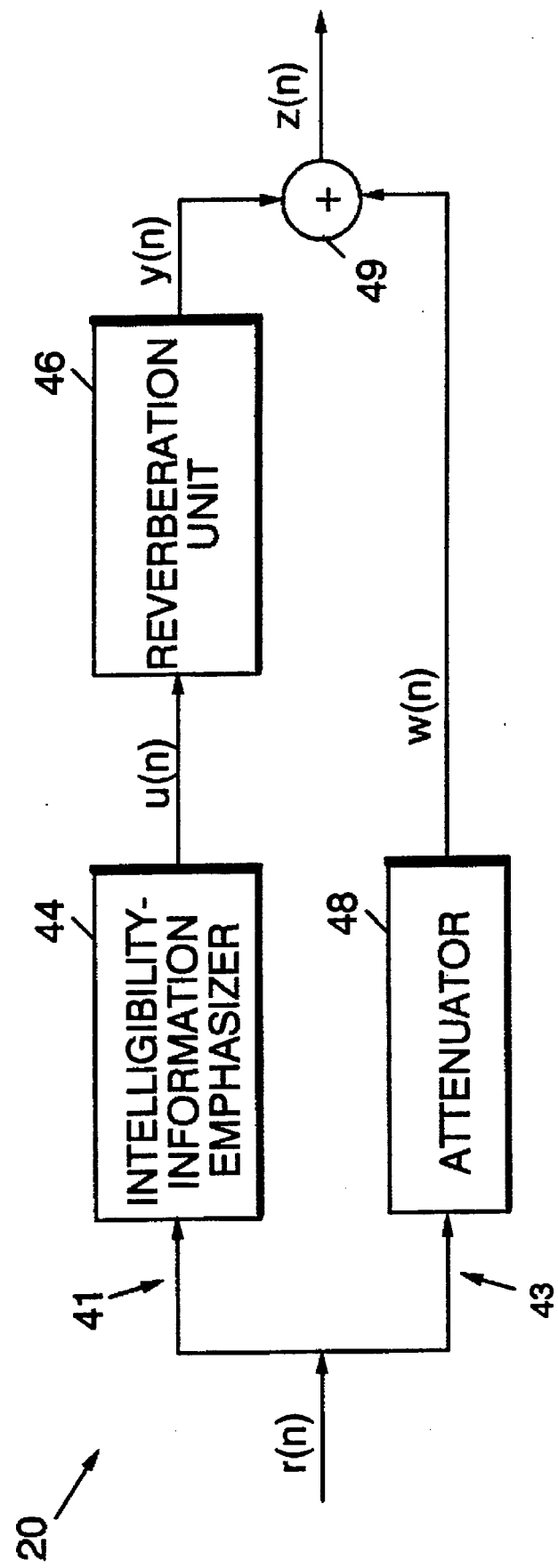
FIG. 2 is a schematic diagram of the intelligibility booster, according to a preferred embodiment of the present invention.

Turning to FIG. 2, a schematic of intelligibility booster 20 is shown. A speech input signal is inputted to the intelligibility booster 20 and is processed in both a reverberation signal path 41 and a direct signal path 43. The speech input signal is formed by a stream of samples and is designated as r(n), where n represents a sample of the digital input signal. The reverberation signal path 41 includes an intelligibility-information emphasizer 44 followed by a reverberation unit 46 which together generate a reverberation signal y(n) in response to the input signal r(n). The direct signal path 43 includes an attenuator 48 and generates an attenuated input signal w(n) in response to input signal r(n). The attenuated input signal w(n) is a direct signal.

An adder 49 combines the reverberation signal y(n) and attenuated input signal w(n) to generate intelligibility-enhanced signal z(n).

The attenuator 48 of the direct signal path 43 attenuates the input signal r(n) approximately 0–3 dB.

Reverberation signal y(n) is generated by first processing the input signal r(n) using the intelligibility-information emphasizer 44 located in the reverberation signal path 41. The intelligibility-information emphasizer 44 functions to emphasize intelligibility information of the speech input signal r(n) so as to output an intelligibility-dense signal u(n). The intelligibility-information emphasizer 44 is implemented in the preferred embodiment by a high pass filter. The frequency response of a preferred intelligibility-emphasizer 44 implemented by a high pass filter is shown in FIG. 3.

Figure 3:
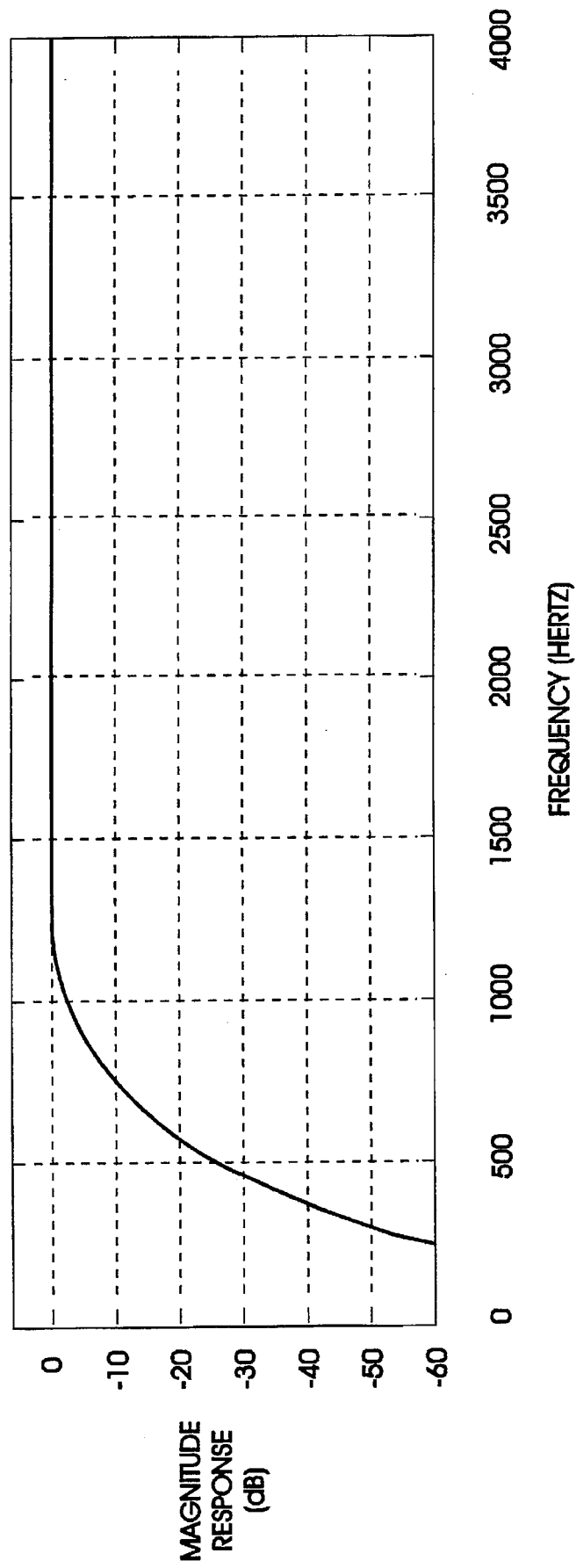
FIGS. 3 shows a graph of the frequency response of the intelligibility-information emphasizer, according to a preferred embodiment of the invention.

The high pass filter shown in FIG. 3 provides a low cut-off frequency of approximately 1 kHz. Accordingly, the intelligibility-dense signal u(n) will represent speech information having a frequency range above 1 kHz. The frequency range selected for emphasis by the high pass filter is a high frequency range of speech that is dense in intelligibility information. In telecommunications applications, speech typically ranges from 300 Hz to 4 kHz, but a large amount of the intelligibility information in speech is concentrated in a higher frequency range beginning at about 1 kHz. In the lower frequency range of 300 Hz to 1 kHz, there is a high concentration of speech identification information.

Intelligibility information in speech enables a listener to determine what is being spoken, while identification information enables a listener to identify the person speaking.

The intelligibility-information emphasizer 44 when implemented with a high pass filter is designed to emphasize the high or intelligibility-dense frequency range of speech. The intelligibility-dense frequency range of the input signal r(n) selected for emphasis can range from approximately 1 to 7 kHz, and in the preferred embodiment ranges from approximately 1 to 3.2 kHz. Emphasizing the intelligibility-dense frequency range of the input signal r(n) increases the amount of intelligibility information relative to the identification information of the intelligibility-dense signal u(n). Identification information for the intelligibility-dense signal u(n) is sacrificed to provide increased intelligibility for the intelligibility-dense signal u(n), and correspondingly, the reverberation signal y(n).

The intelligibility-information emphasizer 44 can also be implemented by a compressor stage that amplifies the low amplitude components and attenuates the high amplitude components of the speech input signal r(n). This results in an emphasis of the intelligibility information of speech because the lower amplitude components of speech are dense on intelligibility information and the high amplitude components of speech are dense on identification information. The intelligibility emphasizer 44 can also include both a compressor stage and a high pass filter for generating intelligibility-dense signal s(n).

Figure 4:
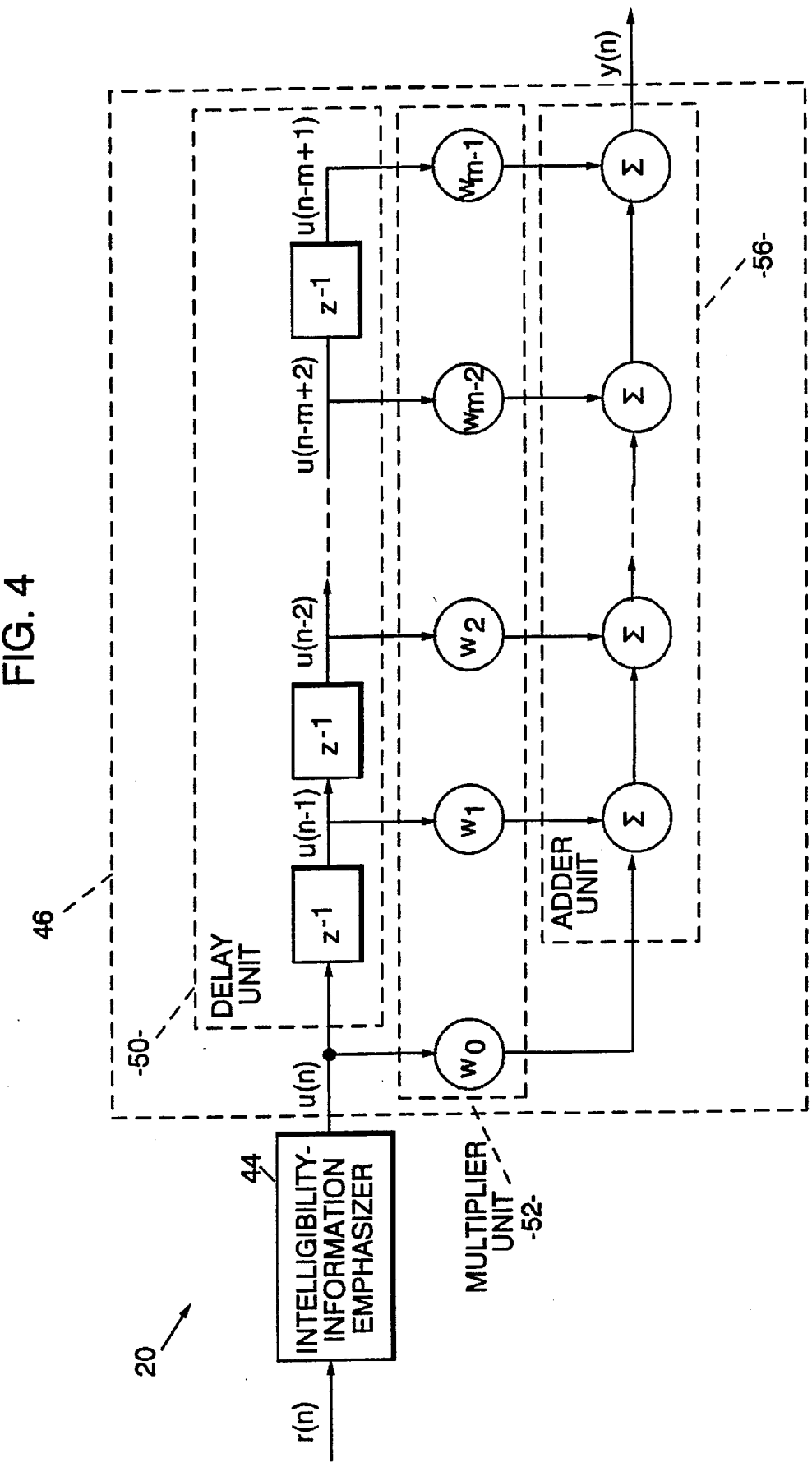
FIG. 4 is a schematic of the reverberation signal path of the intelligibility booster, according to a preferred embodiment of the present invention.

The reverberation unit 46 is located after the intelligibility-information emphasizer 44 in the reverberation signal path 41 and processes the intelligibility-dense signal u(n) to produce a reverberation signal y(n). The reverberation unit 46 is implemented in the preferred embodiment by a finite impulse response (FIR) filter, as shown in FIG. 4. In alternate embodiments, the reverberation unit 46 can be implemented with other types of digital filters such as infinite impulse response (IIR) filters. The general operation of a reverberation unit 46 implemented by an FIR filter is conventional and disclosed in U.S. Pat. No. 5,201,005, issued to Matsushita et al. on Apr. 6, 1993; and U.S. Pat. No. 5,278,780 issued on Jan. 11, 1995, which are both incorporated in their entireties by reference.

In general, reverberation unit 46 functions to process intelligibility-dense signal u(n) to generate a reverberation signal y(n) having a reverberation signal component. The reverberation signal component includes successive sequences of weighted-delay signals. To produce the reverberation signal y(n), the reverberation unit 46 includes a delay unit 50 having a sequence of delay operators z-1, a multiplier unit 52 having a sequence of multipliers $W_0, W_1 \ldots W_{M-1}$, and an adder unit 56 having a sequence of adders $\Sigma$.

The delay unit 50 produces a sequence of delay signals u(n−1), u(n−2), ... u(n−M+1); and the multiplier unit 52 multiples the delay signals with a sequence of filter coefficients $W_0, W_1 \ldots W_{M-1}$ to generate the weighted delay signals. The adder unit 56 sums a sequence of weighted-delay signals to produce the reverberation signal y(n). The reverberation unit output is given by equation 1:

$$y(n) = \sum_{k=0}^{M-1} W_k \cdot u(n-k), \qquad \text{(equation 1)}$$
$$\text{where } k = 0, 1 \ldots, m-1.$$

Equation 1 is referred to as a finite convolution sum because it convolves the finite impulse response (i.e., the weighted-delay signals) of the reverberation unit 46 to generate the reverberation signal y(n). Accordingly, the reverberation signal y(n) is comprised of a sequence of weighted delay signals.

The adder 49 combines the reverberation signal y(n) and attenuated input signal w(n) to produce the intelligibility-enhanced signal z(n). Attenuated input signal w(n) is generated by processing the input signal r(n) with attenuator 48 of the direct signal path 43. Attenuated input signal w(n) is an input signal that has not been processed by intelligibility-information emphasizer 44. The attenuated input signal w(n) provides an ordinary amount of both identification and intelligibility information. However, the reverberation signal y(n) added on top of the input signal w(n) provides an emphasized amount of intelligibility information to the intelligibility-enhanced signal z(n).

Figure 5A:
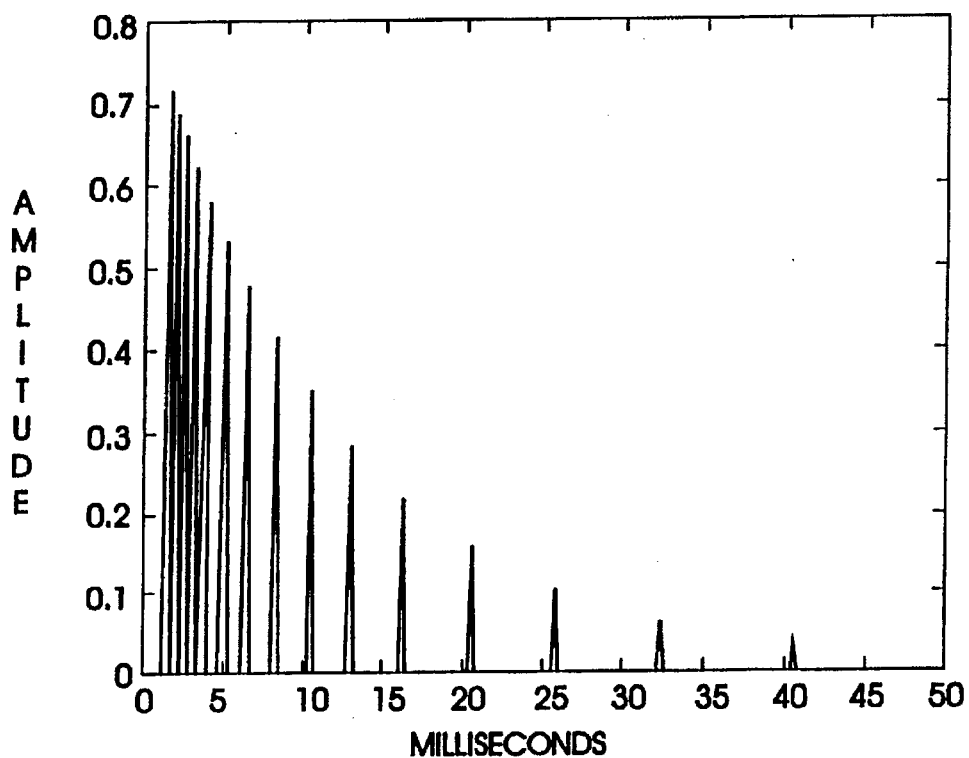
FIG. 5a shows a first impulse response of artificial reverberation generated by the reverberation unit, according to a preferred embodiment of the present invention.

The characteristics of the reverberation signal y(n) are controlled by the filter coefficient sequence of multiplier unit 52. As shown in FIG. 5a, the impulse response of the reverberation unit 46 has two important characteristics controlled by the filter coefficient sequence. First, the amplitudes of a sequence of weighted-delay signals are weighted according to an exponential decay pattern over the reverberation period. Second, the time delay between successive weighted-delay signals has an exponentially-increasing delay pattern over the reverberation period.

More specifically, the filter coefficient sequence includes an exponentially decaying sequence of filter coefficients used to generate weighted-delay signals having exponentially-decreasing, weighted amplitudes. The filter coefficient sequence also includes zero coefficients having zero values or near zero values interposed between the exponentially decaying filter coefficient. The number of coefficients having zero values interposed between the successive exponentially decaying filter coefficients exponentially increases over the reverberation period to increase the delay between successive weighted delay signals over the reverberation period.

In an alternative embodiment, the filter coefficient sequence of the reverberation unit 46 includes exponentially decaying filter coefficients, as shown in FIG. 4b, that vary in sign. This results in the sign of the amplitude of the weighted-delay signals varying over the reverberation period. In this alternate embodiment, the amplitudes of the weighted-delay signals also have an exponentially-decreasing delay pattern between successive weighted-delay signals over the reverberation period.

Intelligibility booster 22 outputs to the loudspeaker 24 an intelligibility-enhanced signal z(n) that includes a direct component corresponding to the attenuated input signal w(n) and a reverberation component corresponding to the reverberation signal y(n). Loudspeaker 24 outputs a sound pressure wave in response to the intelligibility-enhanced signal z(n). The sound pressure wave includes a direct component corresponding to the attenuated input signal w(n) and an artificial reverberation component corresponding to the reverberation signal y(n). The direct component of the sound pressure wave provides both intelligibility information and identification information to a listener in the acoustic space surrounding the loudspeaker 24.

The artificial reverberation component of the sound pressure wave provides an emphasized amount of intelligibility information added on top of the direct component. The artificial reverberation component adds intelligibility information to the outputted speech because the human hearing mechanism "equalizes" (or averages) the incoming sound with a sliding window in time or reverberation period so as to make use not only of the direct sound but also the reflections and echoes from the surroundings. The artificial reverberation component functions as artificial echoes that correspond to natural echoes produced in an optimal acoustic space. The artificial reverberation signal component of the sound wave optimizes the intelligibility of the outputted speech because the characteristics of the reverberation signal component correspond to the characteristics of natural reverberations generated in an optimal acoustic space.

In an optimal acoustic space, direct sound pressure waves produced in the acoustic space are reflected in the acoustic space producing natural echo sequences. At least a portion of the natural echo sequences is directed at a listener located in the acoustic space. Each natural echo sequence has a stream of echoes falling within a reverberation period of between approximately twenty to sixty milliseconds. The echoes provide speech information to the listener located in the acoustic space.

Each natural echo sequence produced in the optimal acoustic space has a few important characteristics which result in an optimal amount of information being provided to the listener. First, the amplitudes of the delay signals tend to exponentially decay over the reverberation period. Second, the delay periods between the echoes tend to exponentially increase over the reverberation period.

In a corresponding manner, the reverberation unit 46 generates a reverberation signal comprised of delay-signal sequences that have a pattern of exponentially decaying amplitudes and that have a pattern of exponentially increasing time delays between delay signals over the reverberation period. Because the delay signal sequences generated by the reverberation unit 46 correspond to natural echoes produced in an optimal acoustic space, the loudspeaker 24 outputs speech sound that includes an artificial reverberation component that maximizes the amount of speech information added by the artificial reverberation signal component.

A third characteristic of a natural echo sequence is that the phase of the stream of echoes arriving at a microphone or listener varies. This results in the sign of the amplitudes of the natural echo varying. The human hearing mechanism compensates for the varying phases of the natural echoes, and an echo sequence having a stream of echoes with varying phases sounds natural to a listener.

Reverberation unit 46, in the alternate embodiment shown in FIG. 4b, varies the sign of the filter coefficients in a generally alternating pattern. By varying the sign of the filter coefficients, the phase of the weighted-delay signals generated by the reverberation unit 46 is varied. Accordingly, the artificial reverberation signal component of the speech output more closely corresponds to natural echoes produced in an optimal acoustic environment, resulting in a more natural sounding speech output.

The reverberation unit 46 also outputs a reverberation signal that is dense in intelligibility information due to the processing of the speech input signal by the intelligibility-information emphasizer 44. Accordingly, the loudspeaker 24 outputs speech that includes an artificial reverberation signal component that increases the amount of intelligibility information added by the artificial reverberation signal component. The intelligibility booster 20 maximizes the intelligibility information of the speech output to overcome background noise that may be present.

Figure 5B:
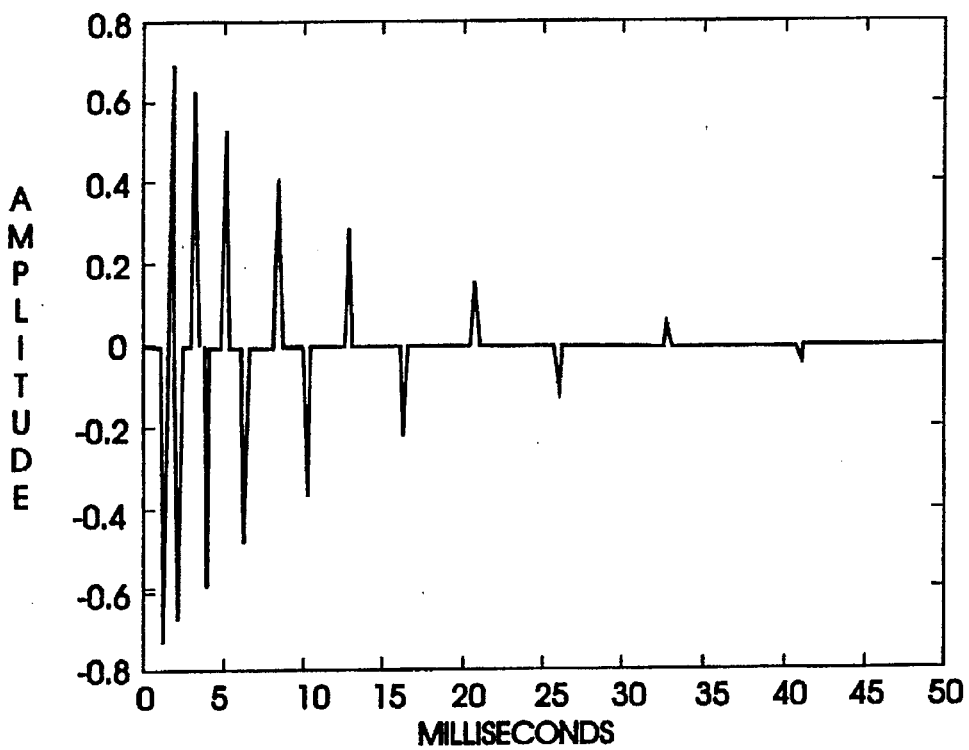
FIG. 5b shows a graph of a second impulse response of artificial reverberation generated by the reverberation unit, according to a preferred embodiment of the present invention.
Figure 6:
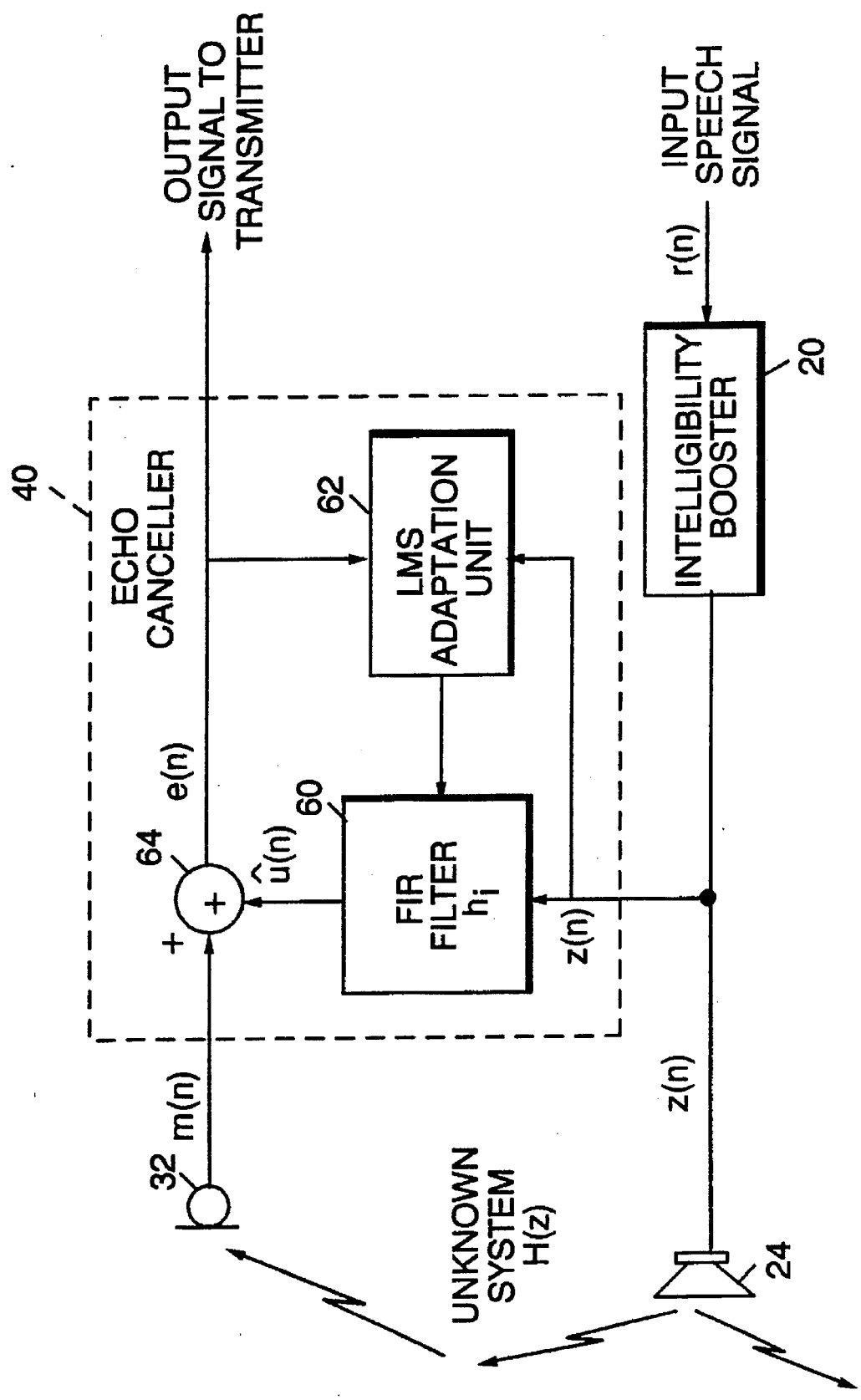
FIG. 6 is a schematic diagram showing the echo canceller, according to the present invention.

Turning to FIG. 5, the intelligibility booster 20 is used in combination with an echo canceller 40. Echo cancellers are known in the prior art as indicated by U.S. patent application Ser. No. 08/393,711, filed Feb. 24, 1995 by Paul Dent and Torbjörn Sölve entitled "Apparatus and Method for Canceling Acoustic Echoes including Non-Linear Distortions in Loudspeaker Telephones", which is incorporated in its entirety by reference. Echo canceller 40 is used in combination with the intelligibility booster 20. The echo canceller 40 uses the intelligibility-enhanced signal z(n) in canceling loudspeaker echoes from the microphone signal m(n) produced by the loudspeaker output (where n denotes discreet time instant n).

The echo canceller 40 is implemented with digital signal processor 22. In the preferred embodiment, the echo canceller 40 includes an FIR filter 60 having filter coefficients $h_i$ (where i denotes the "ith" filter coefficient), an LMS adaptation block 62, and an adder 64. The echo canceller 40 cancels the part of the microphone signal m(n) that is correlated with the loudspeaker output z(n), i.e. the loudspeaker echo.

To cancel the loudspeaker echo, the FIR filter 60 calculates an echo estimate û ("u hat") according to the following equation 2:

$$\hat{u}(n) = \sum_{i=0}^{M-1} h_i \cdot z(n-i), \quad \text{(equation 2)}$$

where M is the number of filter coefficients.

As indicated by equation 2, the echo estimate û is calculated as the convolution sum of the intelligibility-enhanced signal z(n) going to the loudspeaker 24 and the FIR filter coefficients (sometimes called taps), $h_i$, (where i denotes the "i:th" coefficient). In the preferred embodiment, the number of filter coefficients is approximately 200 to 400, which is the number of coefficients typically used to cancel echoes in the interior of a vehicle.

The filter coefficients $h_i$ in equation 2 are calculated according to the Least Mean Square (LMS) method, which is described by the following equation 3:

$$h_i(n+1) = h_i(n) + \mu \cdot e(n) \cdot z(n-i), \quad \text{(equation 3)}$$

where i=0 . . . m−1; and μ=the step or update gain parameter.

The LMS method, first introduced by Widrow and Hoff in 1960, is a stochastic gradient (descent) step method which uses a rough (noisy) estimate of the gradient, e(n)·z(n), to make a small step in the direction to minimize the energy of the echo in the echo-reduced signal, e(n).

The FIR filter 60 has, once it has converged, an impulse response that is approximately the same as the real echo path (the unknown system) from the ûloudspeaker 24 to the microphone 32. The echo replica, e(n), is subtracted from the incoming microphone sample m(n), and thus the echo is subtracted or cancelled, as described by the following equation 4:

$$e(n) = m(n) - \hat{e}(n) \quad \text{(equation 4)}.$$

The number of taps or filter coefficients required to remove the loudspeaker echo, and thus the complexity of the echo canceller 40, is kept to a minimum by using the intelligibility-enhanced signal z(n) in determining echo estimate û(n). Accordingly, echo canceller 40 can be used in conjunction with intelligibility booster 20 without requiring an echo canceller 40 having increased complexity.

Figure 7:
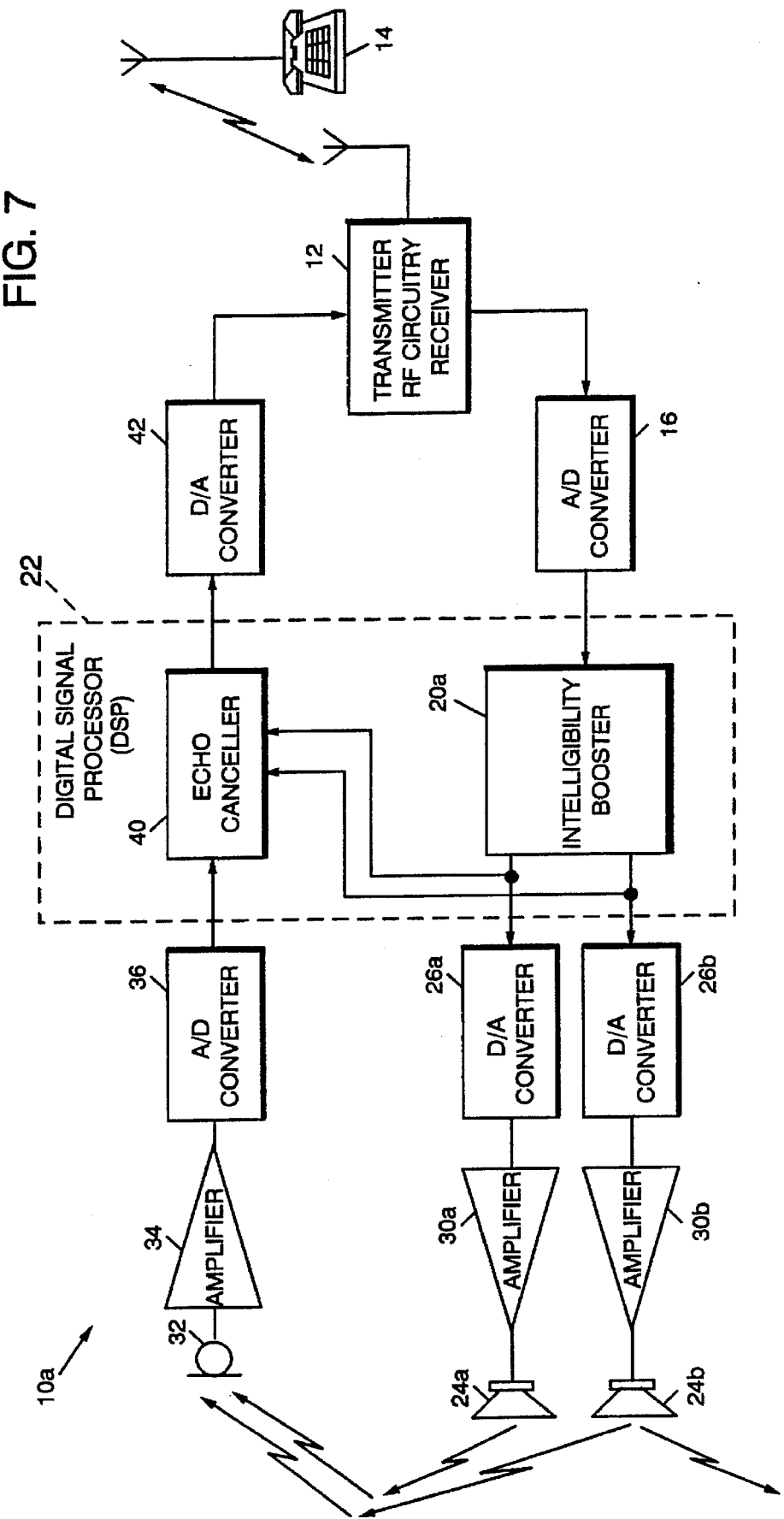
FIG. 7 is a schematic diagram of a telephone, according to an alternate preferred embodiment of the present invention.

Turning to FIG. 7 in alternate embodiment telephone according to the present invention is shown and indicated generally by the numeral 10a. Telephone 10a includes an intelligibility booster 28 adapted to generate a right intelligibility-enhanced signal and a left intelligibility-enhanced signal from a single speech input signal. The right intelligibility-enhanced signal is output to D/A converter 26a, amplifier 30a, and right speaker 24a. The left intelligibility-enhanced signal is output to D/A converter 26b, amplifier 30b, and left speaker 24b. The right and left intelligibility-enhanced signals form a pseudo-stereo signal outputted by the left and right speakers 24a, b which provides extra spatial information to a listener.

Figure 8:
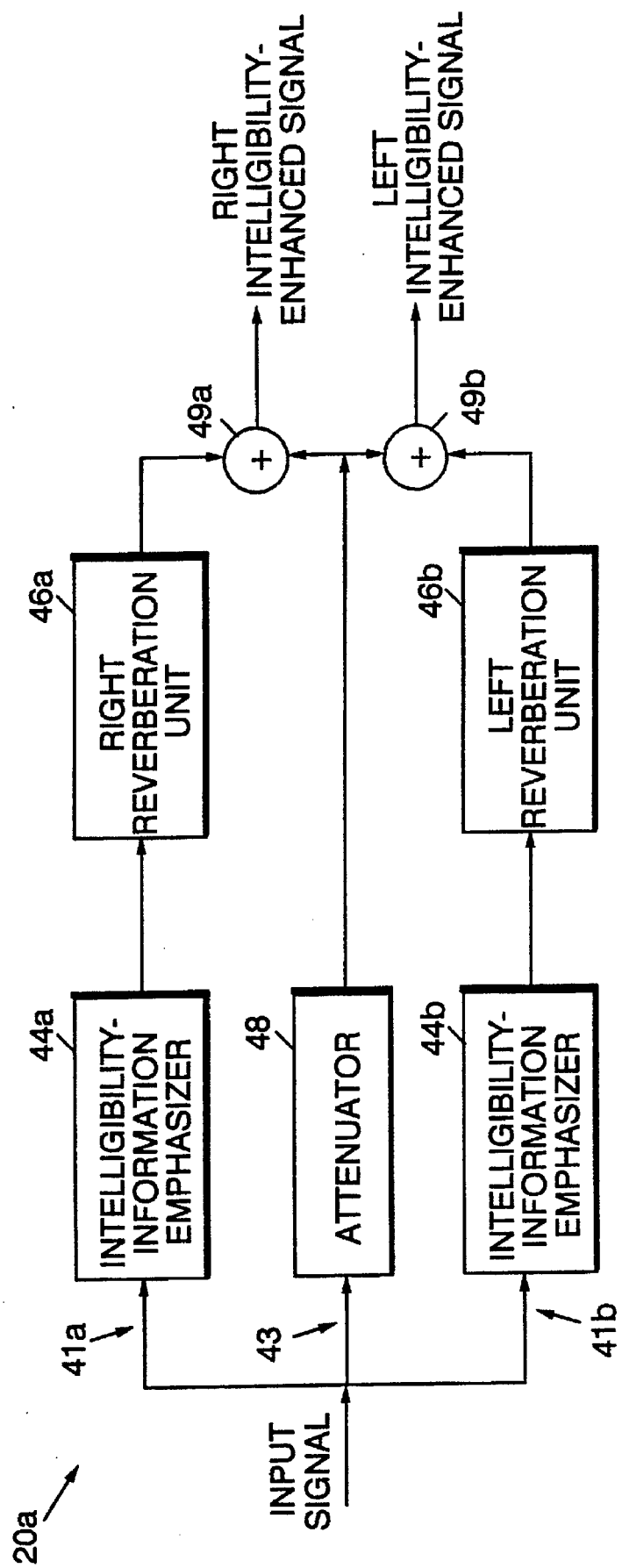
FIG. 8 is a schematic diagram of the intelligibility booster, according to an alternate embodiment of the present invention.

Turning to FIG. 8, a schematic diagram of intelligibility booster 20a is shown. Intelligibility booster 20a includes a direct signal path 43, a right reverberation signal path 41a and a left reverberation signal path 41b. The direct signal path 43 includes an attenuator 48 for attenuating the input signal to produce an attenuated direct signal. The right reverberation signal path includes intelligibility information emphasizer 44a followed by right reverberation unit 46a for generating a right reverberation signal. The left reverberation signal path includes intelligibility information emphasizer 44b followed by left reverberation unit 46b for generating a left reverberation signal. Adder 49a combines the right reverberation signal and the attenuated direct signal to produce the right intelligibility-enhanced signal. Adder 49b combines the left reverberation signal and the attenuated direct signal to generate the left intelligibility-enhanced signal.

Figure 9:
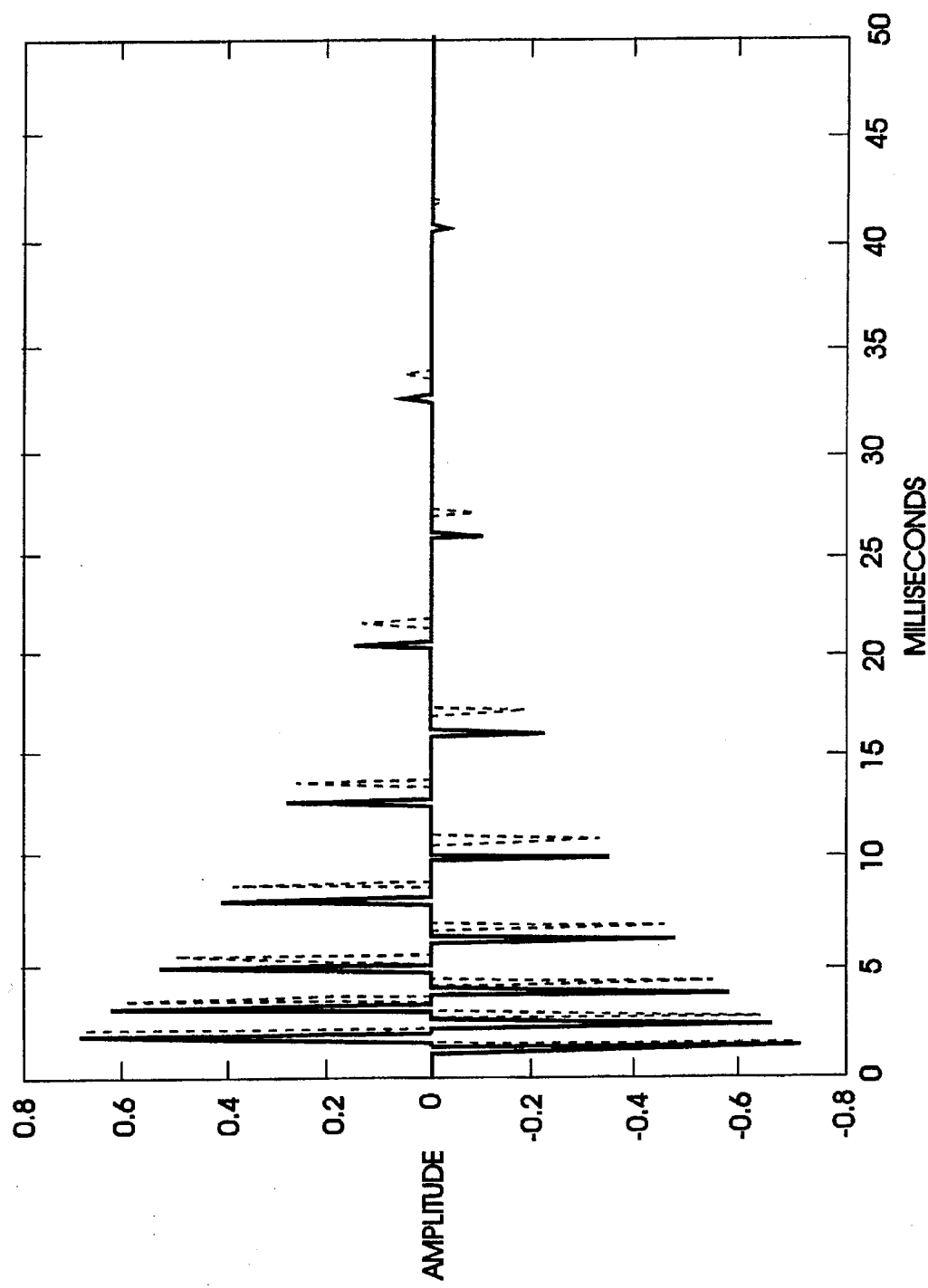
FIG. 9 shows an impulse response of artificial reverberation generated by the right reverberation unit and an impulse response of artificial reverberation generated by the left reverberation unit, according to an alternate embodiment of the present invention.

The direct signal path 43, the right reverberation signal path 41a and the left reverberation signal path 41b each processes the input signal in a manner analogous to that described with respect to intelligibility booster 20 of the preferred embodiment telephone 10. The right reverberation unit 46a and the left reverberation 46b, however, are adapted to have different impulse response functions with respect to one another, as shown in FIG. 9. FIG. 8 shows the impulse response of the right reverberation unit 46a with solid lines and the impulse response of the left reverberation unit 46b with dotted lines. As shown in FIG. 9, the weighted delay signals generated by the right reverberation unit 46a have delays that are offset from the delays of the weighted delay signals generated by the left reverberation unit 46b. By offsetting the time delays of the weighted delay signals generated by the right and left reverberation unit 46a, b, the right and left loudspeakers 24a, 24b output slightly different loudspeaker outputs. Accordingly, the loudspeaker output from loudspeakers 24a,b emulate a pseudo-stereo field with extra spatial information. The characteristics of the right and left reverberation signals can be adjusted in the manner described for intelligibility booster 20 of the preferred embodiment telephone 10.

The present invention provides an apparatus and method for increasing the intelligibility of a loudspeaker output and for echo cancellation for telephones. This invention may be embodied in many different forms and should not be construed as limited to the embodiment set forth herein; rather, these embodiments are provided so that this disclosure will be thorough and complete, and will fully convey the scope of the invention to those skilled in the art.

What is claimed is:

1. A telephone comprising:
   a) an intelligibility booster responsive to a speech input signal received from a remote telephone for generating an intelligibility-enhanced signal including a direct signal component and a reverberation signal component, the reverberation signal component including a stream of reverberation sequences, wherein each reverberation sequence includes a stream of weighted delay signals falling within a predetermined reverberation period, the amplitudes of the weighted delay signals of each reverberation sequence weighted over the reverberation period according to an exponential decay pattern; and
   b) a loudspeaker for producing a sound pressure wave in response to the intelligibility-enhanced signal, the sound pressure wave including a direct component corresponding to the direct signal and an artificial reverberation component corresponding to the reverberation signal of the intelligibility booster.

2. The telephone of claim 1, wherein the weighted delay signals of each reverberation sequence have a delay pattern where the time delays between weighted delay signals tends to increase over the reverberation period.

3. The telephone of claim 1, wherein the signs of the weighted delay signals of a reverberation sequence are varied.

4. The telephone of claim 1, further including:
   a) a microphone positioned in an acoustic path of the sound pressure waves produced by the loudspeaker and generating a microphone signal; and
   b) an echo canceller responsive to the intelligibility-enhanced signal and microphone signal for generating an estimated echo signal corresponding to the sound pressure wave produced by the loudspeaker and subtracting the estimated echo signal from the microphone output signal thereby reducing loudspeaker echo from the microphone signal.

5. The telephone of claim 1, further including:
   a) a microphone positioned in an acoustic path of the sound pressure waves produced by the loudspeaker and generating a microphone signal; and
   b) an echo canceller responsive to the intelligibility-enhanced signal and microphone signal for generating an estimated echo signal corresponding to the sound pressure wave produced by the loudspeaker and subtracting the estimated echo signal from the microphone output signal thereby reducing loudspeaker echo from the microphone signal.

6. The telephone of claim 3, wherein the signs of the weighted delay signals are varied in an alternating pattern.

7. The telephone of claim 1, wherein the intelligibility booster includes:
   a) a reverberation signal path including:
      1) an intelligibility-information emphasizer responsive to the speech input signal for emphasizing intelligibility information of the input speech signal and for outputting an intelligibility-dense signal, and
      2) a reverberation unit responsive to the intelligibility-dense signal for generating the reverberation signal component;
   b) a direct signal path responsive to the speech input signal for outputting the direct signal component; and
   c) wherein the reverberation signal component and the direct signal component are combined so as to form components of the intelligibility-enhanced signal.

8. The telephone of claim 7, wherein the intelligibility-information emphasizer is a compressor.

9. The telephone of claim 7, wherein the direct signal path includes an attenuator responsive to the speech input signal for attenuating the speech input signal so that the direct signal component is an attenuated speech input signal.

10. The telephone of claim 7, wherein the reverberation unit is a finite impulse response (FIR) filter.

11. The telephone of claim 7, wherein the intelligibility-information emphasizer is a high-pass filter having a lower cut-off frequency corresponding to the lower limit of a predetermined frequency range corresponding to an intelligibility-dense frequency range of speech.

12. The telephone of claim 11, wherein the predetermined frequency range has a lower limit greater than approximately 1 kHz.

13. The telephone of claim 11, wherein the predetermined frequency range is approximately 1 kHz and 4 kHz.

14. A telephone comprising:
   a) a reverberation unit responsive to a speech input signal for generating a reverberation signal, the reverberation unit including:
      1) a delay unit responsive to the speech input signal for outputting delay-signal sequences where each delay-signal sequence includes a stream of delay signals falling within a reverberation period,
      2) a multiplier unit responsive to the delay-signal sequences for multiplying the delay signals of each delay-signal sequence with a predetermined filter coefficient sequence so as to produce a reverberation sequence of weighted delay signals, wherein the filter coefficient sequence has an exponential decay pattern where the weights of the delay signals of a delay-signal sequence tend to exponentially decrease over the reverberation period, and
      3) an adder unit for combining the weighted delay signals of each reverberation sequence to form the reverberation signal; and
   b) a loudspeaker responsive to the reverberation signal for outputting a sound wave having an artificial reverberation component corresponding to the reverberation signal generated by the reverberation unit.

15. The telephone of claim 14, wherein the delay unit has a sequence of delay operators for determining the time delays between successive delay signals of each delay-signal sequence, wherein the delay operators determine the time delays according to a delay pattern where the time delay between successive delay signals tends to increase over the reverberation period.

16. The telephone of claim 14, wherein the signs of the filter coefficient sequence and varied so as to vary the signs of the weighted delay signals of each reverberation sequence.

17. The telephone of claim 14, wherein the reverberation unit is a finite impulse response (FIR) filter.

18. The telephone of claim 16, wherein the signs of the filter coefficient sequence are varied according to an alternating pattern so that the signs of the weighted delay signals of each reverberation sequence alternate.

19. A telephone comprising:
   a) a reverberation signal path responsive to a speech input signal for generating a reverberation signal including:
      1) an intelligibility-information emphasizer responsive to the speech input signal for emphasizing intelligibility information of the input speech signal and for outputting an intelligibility-dense signal, and 2) a reverberation unit responsive to the intelligibility-dense signal for generating the reverberation signal;
   b) a direct signal path responsive to the speech input signal for outputting a direct signal;
   c) an adder for combining the reverberation signal and the direct signal so as to form an intelligibility-enhanced signal; and
   d) a loudspeaker responsive to the intelligibility-enhanced signal for outputting a sound wave having a reverberation component corresponding to the reverberation signal and a direct component corresponding to the speech input signal.

20. The telephone of claim 19, wherein the direct signal path of the intelligibility booster includes an attenuator for attenuating the speech input signal.

21. The telephone of claim 19, wherein the reverberation signal has reverberation sequences of weighted delay signals extending over a reverberation period, and wherein each reverberation sequence has a delay pattern where the time delays between weighted delay signals tends to increase over the reverberation period.

22. The telephone of claim 19, wherein the reverberation signal has reverberation sequences of weighted delay signals extending over a reverberation period, and wherein the amplitudes of the weighted delay signals of each reverberation sequence are weighted over the reverberation period according to an exponential decay pattern.

23. The telephone of claim 19, wherein the intelligibility-information emphasizer is a high-pass filter having a lower cut-off frequency corresponding to the lower limit of a predetermined frequency range corresponding to an intelligibility-dense frequency range of speech.

24. The telephone of claim 19, wherein the intelligibility-information emphasizer is a compressor.

25. The telephone of claim 19, wherein the reverberation unit is a finite impulse response (FIR) filter.

26. A telephone comprising:
 a) an intelligibility booster responsive to a speech input signal for generating a first intelligibility-enhanced signal and a second intelligibility-enhanced signal, the intelligibility booster including:
  1) a first reverberation signal path responsive to the speech input signal including a first reverberation unit for generating a first reverberation signal, wherein the first reverberation signal is a component of the first intelligibility-enhanced signal,
  2) a second reverberation signal path responsive to the speech input signal including a second reverberation unit for generating a second reverberation signal, wherein the second reverberation signal is a component of the second intelligibility-enhanced signal, and
  3) wherein the first and second reverberation units have different impulse functions with respect to one another so as to generate different reverberation signals;
 b) a direct signal path responsive to the speech input signal for outputting a direct signal;
 c) an adder for combining the first reverberation signal and the direct signal so as to form the first intelligibility-enhanced signal, and for combining the second reverberation signal and the direct signal so as to form the second intelligibility-enhanced signal;
 d) a first loudspeaker responsive to the first intelligibility-enhanced signal for outputting a first sound wave having a first reverberation component corresponding to the first reverberation signal and a direct component corresponding to the speech input signal; and
 e) a second loudspeaker responsive to the second intelligibility-enhanced signal for outputting a second sound wave having a second reverberation component corresponding to the second reverberation signal and a direct component corresponding to the speech input signal.

27. The telephone of claim 26, wherein the first and second reverberation signals each include sequences of weighted delay signals, and wherein the impulse response of the left and right reverberation units provide for different time delays.

28. The telephone of claim 26, wherein the direct signal path of the intelligibility booster includes an attenuator for attenuating the speech input signal.

* * * * *